United States Patent [19]

Aihara

[11] Patent Number: 4,545,665

[45] Date of Patent: Oct. 8, 1985

[54] FOCUS DETECTING DEVICE

[75] Inventor: Yoshihiko Aihara, Tokyo, Japan

[73] Assignee: Canon Kabushiki Kaisha, Tokyo, Japan

[21] Appl. No.: 590,064

[22] Filed: Mar. 15, 1984

[30] Foreign Application Priority Data

Mar. 23, 1983 [JP] Japan ................................. 58-48511

[51] Int. Cl.⁴ .............................................. G03B 3/00
[52] U.S. Cl. .................................. 354/402; 354/403; 354/409; 354/443
[58] Field of Search ............................. 354/400–410, 354/484, 441, 442, 443

[56] References Cited

U.S. PATENT DOCUMENTS

| | | | |
|---|---|---|---|
| 4,157,217 | 6/1979 | Isono | 354/405 |
| 4,246,476 | 1/1981 | Stauffer | 354/407 X |
| 4,344,679 | 8/1982 | Yagi et al. | 354/409 |
| 4,387,975 | 6/1983 | Araki | 354/403 |
| 4,470,676 | 9/1984 | Kinoshita et al. | 354/409 X |

*Primary Examiner*—William B. Perkey
*Attorney, Agent, or Firm*—Toren, McGeady, Stanger, Goldberg & Kiel

[57] ABSTRACT

A focus detecting device for a camera adjusts its accuracy according to a selected one of available photographic modes, such as a panning mode using a shutter preference arrangement, a snap-shot mode using a normal combination of shutter time and an aperture value, or a portrait mode using an aperture preference arrangement.

6 Claims, 7 Drawing Figures

FOCUS DETECTING DEVICE

BACKGROUND OF THE INVENTION

1. Field of the Invention

This invention relates to cameras, and particularly to an automatic focusing device which automatically shifts its focusing accuracy according to the exposure control mode selected for the camera.

2. Description of the Prior Art

Generally, when a camera's depth of field is made shallow by a wide open aperture, the resulting pictures tend to be cut-of-focus unless the focusing accuracy is very high. Conversely, a long depth of field produced by a stopped-down aperture may result in a sharply focused picture even when the main object to be photographed is located away from an in-focus position as long as the object is within the limits of the depth of field. It is conceivable to lower the focusing accuracy when the depth of field is greater than a certain given value and increase the accuracy when the depth of field is shallower than the given value. This concept has prompted development of a method of shifting the degree of focusing accuracy on the basis of an aperture value obtained either from an photometric computation circuit or an aperture ring. This method is disclosed, for example, in U.S. patent application Ser. No. 59,635, U.S. Pat. No. 4,157,217, etc.

However, photographers are sometimet forced by an insufficient light condition, such as the dusk of the evening or a cloudy sky, to photograph with the lens aperture open as wide as possible. This results in a shallow depth of field. If, in that event, the shallow depth of field causes the camera to detect the focus automatically with greater degree of focus detection accuracy, the focus detecting operation may take too long to seize an unexpected picture-taking opportunity. Therefore, determining the focusing accuracy merely on the basis of the photo-taking aperture value hardly makes it possible to carry out focus detection operations at different degrees of accuracy suited for different photographing modes such as a panning mode which requires quick shooting, a portrait mode, etc.

SUMMARY OF THE INVENTION

This invention is directed to the solution of the above-stated problem of the prior art. It is thus an object of the invention to provide a camera which is capable of automatically determining a degree of focusing accuracy most suited for obtaining a picture effect desired by the photographer and which carries out automatic focusing according to the result of the determination. To attain this object, the camera according to the invention is provided with a focus detecting device which has a plurality of photographing operation or exposure control modes and automatically selects a degree of focusing accuracy most suited to the mode selected.

The above and further objects and features of the invention will become apparent from the following detailed description of a preferred embodiment thereof taken in connection with the accompanying drawings.

DETAILED DESCRIPTION OF THE PREFERRED EMBODIMENT

Figure 1:
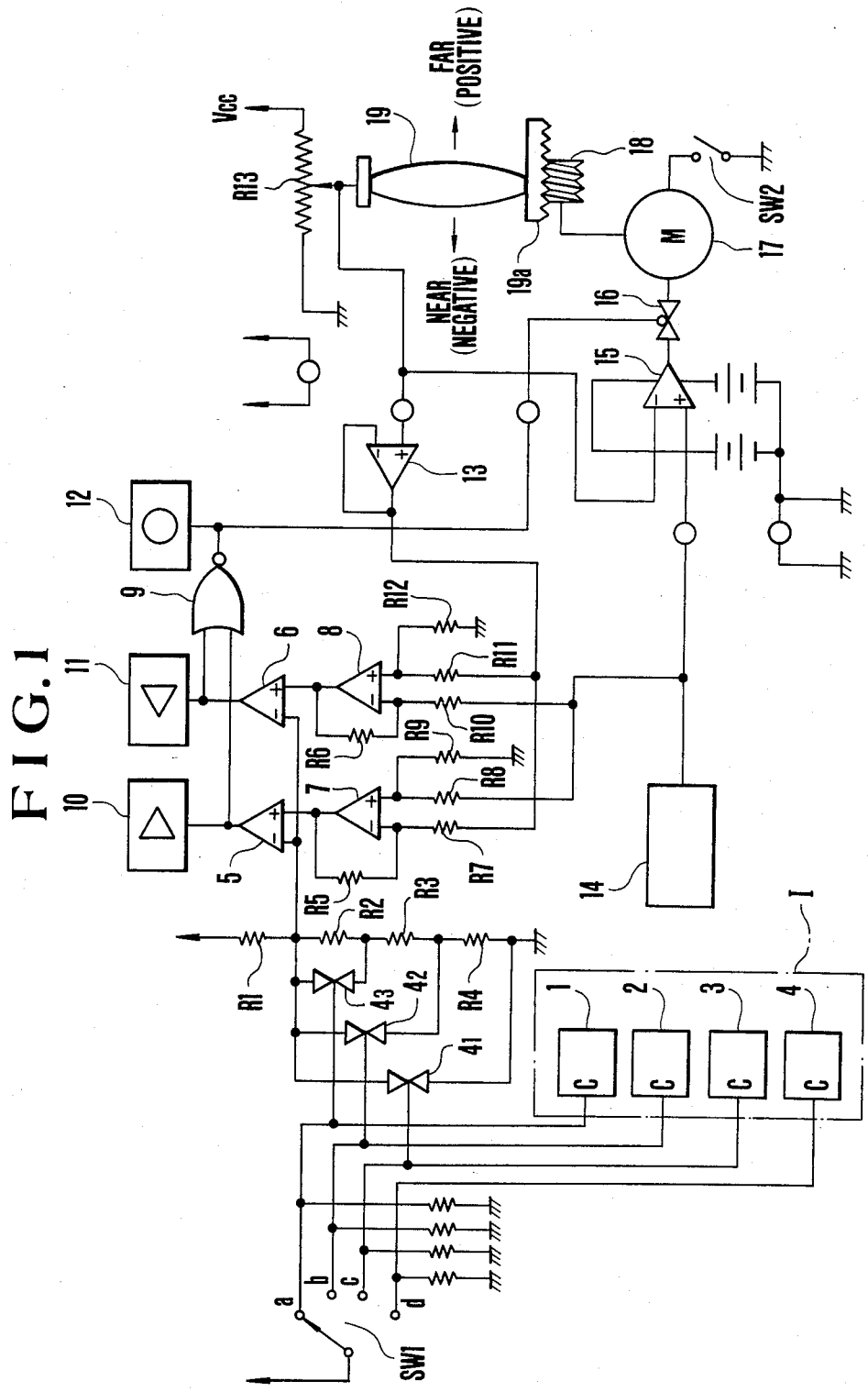
FIG. 1 is a circuit diagram showing the control circuit arrangement of an automatic focusing device of a camera arranged as an embodiment of the present invention.
Figure 2:
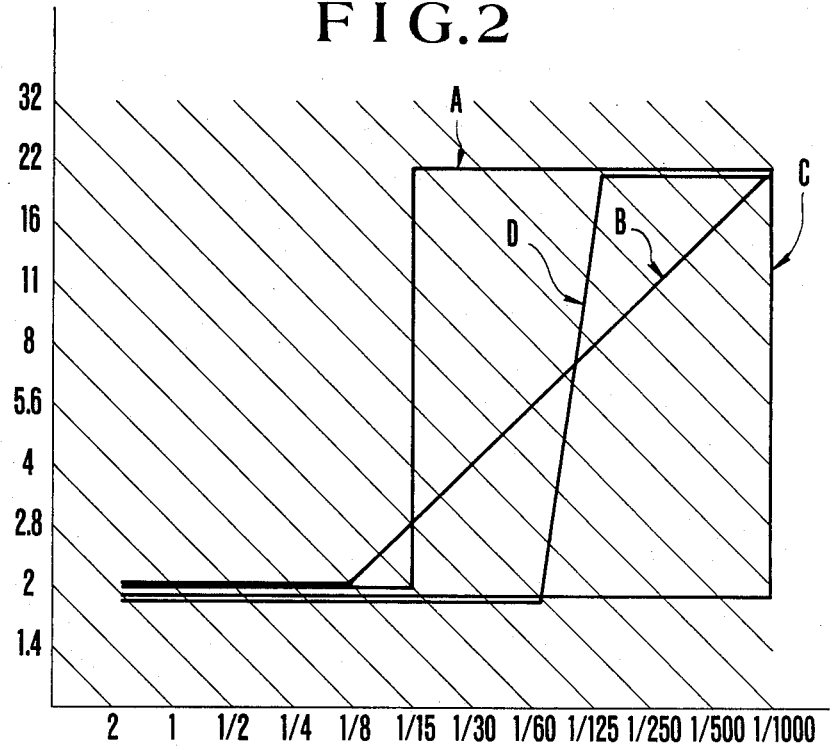
FIG. 2 shows program lines for various photographing or exposure control modes of the camera of FIG. 1.

An embodiment of the present invention is arranged as shown in the accompanying drawings, in which: FIG. 1 shows the control circuit of a camera provided with an automatic focusing device. The circuit arrangement of FIG. 1 includes a photographic mode selection switch SW1. This switch SW1 selectively shifts from one to another of four photographing modes including a panning shot mode, a normal program mode, a portrait program mode (hereinafter called portrait mode) and a snap-shot program mode (hereinafter called snap mode). The meaning of these modes is as follows: The panning shot mode is a shutter speed preference mode in which the camera follows the movement of a moving object at a low shutter speed. In FIG. 2, a program line A applies to the panning shot mode. The normal program mode is a standard program mode in which a photographic exposure is carried out at a most frequently used combination of an aperture value and a shutter speed. A program line B of FIG. 2 applies to the normal program mode. The portrait mode is an aperture preference mode in which wide apertures are used to wide the depth of field shallow. In FIG. 2, a program line C applies to the portrait mode. The snap mode is programmed as shown by a program line D in FIG. 2 to apply to a sudden occurrence of a good picture-taking opportunity requiring quick release of the shutter. In this mode, the shutter speed is arranged to be set mostly at a speed between 1/125 and 1/60 sec.

A panning shot, or planning, mode computing circuit 1 is arranged to become operative when a high level (hereinafter also called an H level) signal is impressed on its input terminal C. Then, the shutter speed T and the aperture value F-No are determined on the program line A of FIG. 2 according to the output of a photometric or light measuring circuit.

A normal program mode computing circuit 2 is arranged to become operative when an H level signal is impressed on its input terminal C. With the circuit 2 becoming operative, the shutter speed T and the aperture value F-No are determined on the program line B of FIG. 2 according to the output of the light measuring circuit.

A portrait mode computing circuit 3 is arranged to become operative when an H level signal is impressed on its input terminal C. Then, the shutter speed T and the aperture value F-No are determined on the program line C of FIG. 2 according to the output of the light measuring circuit.

A snap mode computing circuit 4 is arranged to become operative when an H level signal is impressed on its input terminal C. Then, the circuit 4 determines the shutter speed T and the aperture value F-No on the program line D of FIG. 2 according to the output of the light measuring circuit.

These mode computing circuits 1-4 are included in an exposure control circuit I. The exposure control circuit I may be selected from known circuits of cameras of the shutter or aperture preference type or the program control type. However, the details of the exposure control circuit I are omitted from description here as it is not directly related to the present invention.

The circuit diagram of FIG. 1 further includes analog switches $4_1$, $4_2$ and $4_3$; comparators 5 and 6; operational amplifiers 7 and 8; a NOR gate 9; external display devices 10, 11 and 12, the display device 10 being arranged to show a near-focus state, the device 11 to show a far-focus state and the device 12 to show an in-focus state; an operational amplifier 13; a distance measuring circuit 14 arranged to produce a positive voltage corresponding to a distance to an object to be photographed; an operational amplifier 15; an analog switch 16; a motor 17; a gear 18; and a lens system 19 which is mounted on a rack 19a. The gear 18 is turned by the motor 17 and transmits the rotation of the motor 17 to the rack 19a to shift the position of the lens system 19 back and forth. The focal point of the lens system 19 is adjusted to the surface of film (not shown) with the lens system thus shifted back and forth. A slide rheostat or resistor R13 is arranged to slide with the lens system 19 as it shifts back and forth. A selection switch SW2 is arranged to permit selection between an automatic focusing operation on the lens (hereinafter called AF) and a manual focusing operation (hereinafter called QF) in which the focal point of the lens is manually adjusted while watching a focusing condition displayed at a view finder. The QF operation can be performed with the selection switch SW2 turned off while the AF operation is performed with the switch SW2 turned on.

Figure 3:
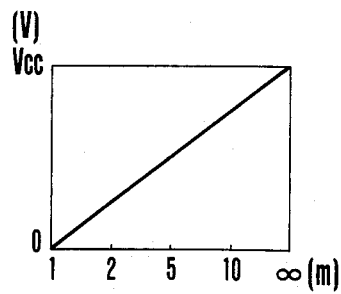
FIG. 3 is a graph showing the relation of the output voltage of a distance measuring circuit shown in FIG. 1 to an object distance.
Figure 4:
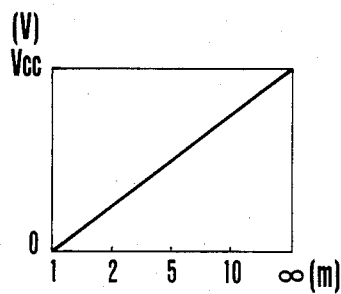
FIG. 4 is a graph showing the relation of voltage division by a slide rheostat to the object distance.

Referring to FIGS. 3 and 4, the embodiment arranged as described above operates as follows: When a power supply switch (not shown) is turned on, the distance measuring circuit 14 begins to operate. The distance measuring circuit 14 produces a voltage corresponding to the object distance as shown in FIG. 3. The voltage thus produced is supplied to the non-inverting input terminal of the operational amplifier 15 located on the lens side. The operational amplifier 15 produces a signal of positive potential when the voltage supplied to its non-inverting input terminal is higher than a voltage supplied to its inverting input terminal. The signal of positive potential produced from the operational amplifier 15 is impressed on the motor 17 to cause the motor 17 to rotate clockwise. The rotation of the motor 17 is transmitted via the gear 18 to the rack 19a to cause the lens system 19 to shift to the right. The rightward shift of the lens system 19 causes the slide resistor R13 to slide. The voltage divided by the resistor R13 then increases accordingly. However, since this divided voltage is impressed on the inverting input terminal of the operational amplifier 15, the voltage supplied to the inverting input terminal of the operational amplifier 15 also increases. As a result, the potential of the output of the operational amplifier 15 becomes zero when the voltage impressed on the inverting input terminal of the operational amplifier 15 becomes equal to the voltage impressed on the non-inverting input terminal. This brings the motor 17 to a stop.

FIG. 4 shows the relation of the voltage divided by the slide resistor R13 shown in FIG. 1 to the object distance on which the lens system 19 is focused. Comparison between FIGS. 3 and 4 indicates that the in-focus state of the lens system 19 obtains at the object distance measured by the distance measuring circuit when the output voltage of the distance measuring circuit becomes equal to the divided voltage obtained from the slide resistor. The motor stops in this condition. Where the voltage impressed on the inverting input terminal of the operational amplifier 15 becomes higher than the voltage impressed on its non-inverting input terminal, the operational amplifier 15 produces an output of negative potential. This causes the motor 17 to rotate counterclockwise. The counterclockwise rotation of the motor 17 is transmitted via the gear 18 to the rack 19a to shift the lens system to the left. The voltage divided by the slide resistor R13 decreases as the lens system 19 moves to the left. As a result, the voltage impressed on the inverting input terminal of the operational amplifier 15 decreases. Then, the potential of the output of the operational amplifier 15 becomes zero when the values of the voltages impressed on the non-inverting and inverting input terminals become equal to each other. The motor 17 comes to a stop and the lens system 19 stops at an in-focus position. The lens system 19 is thus always controlled to have its focal point brought on the film surface by virtue of a servo operation.

Figure 5A:
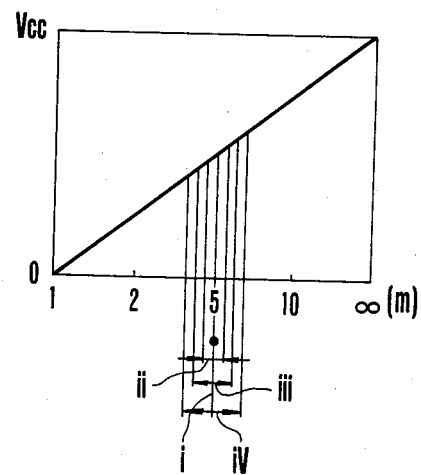
FIGS. 5(a) and 5(b) are illustrations showing differences in focusing accuracy between various exposure control modes of the camera shown in FIG. 1, FIG. 5(a) showing the difference in focusing accuracy on the short distance side and FIG. 5(b) showing it on the long distance side.
Figure 5B:
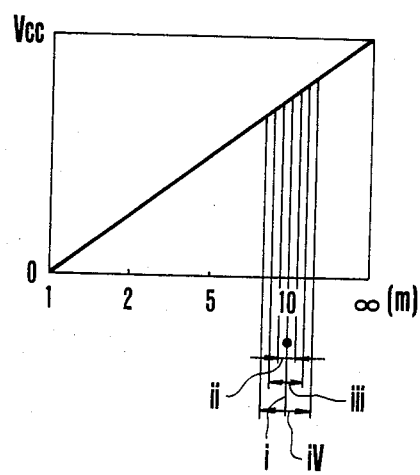

The focus detecting operation of the ebodiment in each of the photographing modes is as follows: When the switch SW1 is shifted to its contact position "c", the portrait mode computing circuit 3 is selected. The circuit 3 then performs a photometric computation according to the program line C of FIG. 2. Meanwhile, the selection of the switch position "c" renders the analog switch $4_1$ conductive. Then, a zero potential is impressed on the inverting input terminals of the comparators 5 and 6. The divided voltage of the slide resistor R13 is then followed by the operational amplifier 13. After that, the divided voltage is supplied via the resistor R11 to the non-inverting input terminal of the operational amplifier 8 and is also supplied via the resistor R7 to the inverting input terminal of another operational amplifier 7. The output voltage of the distance measuring circuit 14 on the other hand is supplied via the resistor R10 to the inverting input terminal of the operational amplifier 8 and is also supplied via the resistor R8 to the non-inverting input terminal of the operational amplifier 7. The resistors R5, R7, R8 and R9 and the operational amplifier 7 jointly form a known differential amplifier. Therefore, the output voltage of the operational amplifier 7 produces a difference VM−VL between the divided voltage VL produced by the slide resistor R13 and the voltage VM produced by the distance measuring circuit. Meanwhile, the resistors R6, R10, R11 and R12 and the operational amplifier 8 likewise jointly form a differential amplifier. Therefore, the output terminal of the operational amplifier 8 produces a voltage VL−VM. Where the voltage VL is larger than the voltage VM, i.e. VL−VM>0, the lens system 19 deviates from the in-focus position to the right. Since the output voltage of the operational amplifier 8 is equal to VL−VM, the output voltage is positive. This output voltage of the operational amplifier 8 is supplied to the non-inverting input terminal of the comparator 6. In the meantime, the inverting input terminal of the comparator 6 receives a zero potential. The output level of the comparator 6 therefore becomes an H level. This H level output causes the far-focus display device 11 to light up to inform the operator of the camera that the position of the lens system 19 deviates to the right from its in-focus position. Further, in case the voltage VM is larger than the voltage VL, i.e. in the event of a condition VM−VL>0, the lens system 19 deviates to the left from the in-focus position. In this instance, the operational amplifier 7 produces an output of positive potential as its output voltage is equal to a value VM−VL. This output voltage is supplied to the non-inverting input terminal of the comparator 5. Since the zero potential input is supplied to the inverting input terminal of the comparator 5, the output level of the comparator 5 becomes an H level. The H level output of the comparator 5 then causes the near-focus state display device 10 to light up to inform the camera operator that the position of the lens system 19 deviates leftward from the in-focus position. When the lens system 19 reaches the in-focus position, a relation VL=VM prevails. Therefore, the potentials of the outputs of both the operational amplifiers 8 and 7 become zero. As a result, the output levels of both the comparators 5 and 6 become L levels. In this instance, L level inputs are supplied to both input terminals of the NOR gate 9. The output level of the NOR gate 9 then becomes an H level to light up the in-focus state display device 12 which thus informs the camera operator of the in-focus state of the lens system. The H level output of the NOR gate 9 also turns off the analog siwtch 16 to prevent the output of the operational amplifier 15 from being supplied to the motor 17. This brings the rotation of the motor 17 to a stop. As indicated by the reference symbol i in FIGS. 5(a) and 5(b), the accuracy of focusing in this instance has a zero tolerance range and is highly accurate. When the switch SW1 is shifted to the contact position "b" thereof, the normal program mode computing circuit 2 is selected. Then, the photometric computation is performed according to the program line B of FIG. 2. At the same time, the analog switch 4$_2$ becomes conductive. Therefore, the voltage Vcc·R4/(R1+R4) which is divided through the resistors R1 and R4 is supplied to the inversion input terminals of the comparators 5 and 6. Then, if the lens system 19 deviates from the in-focus position to the right, the voltage VL>the voltage VM. Therefore, the operational amplifier 8 produces a voltage VL−VM of positive potential. This output of the operational amplifier 8 is supplied to the non-inverting input terminal of the comparator 6. In this case, if the value VL−VM is larger than the voltage Vcc·R4/(R4+R1) which is supplied to the non-inverting input terminal of the comparator 6, the comparator 6 produces an H level output to inform the camera operator of a far-focus state of the lens system. However, if the value VL−VM is smaller than the voltage Vcc·R4/(R4+R1), the comparator 6 produces an L level output. Then, since the output of the operational amplifier 7 is of negative potential, the comparator 5 produces an L level output. Accordingly, L level inputs are impressed on both input terminals of the NOR gate 9 to cause the NOR gate 9 to produce an H level output. As a result, an in-focus state is displayed. The analog switch 16 is turned off to bring the rotation of the motor 17 to a stop.

In case that the position of the lens system 19 deviates from the in-focus position to the left, instead of to the right, the embodiment operates as follows: The voltage VM−VL is also of positive potential. However, if the value of VM−VL is smaller than the value Vcc·R4/(R4+R1), the comparator 5 produces an L level output. In that instance, therefore, there is no near-focus display. Instead, an in-focus display occurs and the rotation of the motor 17 comes to a stop.

As will be apparent from the above description, with the normal program mode selected by the switch SW1, the lens system 19 is considered to be in an in-focus state even when the lens system deviates from the in-focus position to the right or left to an extent corresponding to the value Vcc·R4/(R4+R1). In other words, in this case, the tolerance range of determination by the comparator is widened to allow the degree of focusing accuracy to degrade to that extent. The focusing accuracy in this instance is that indicated by the reference symbol ii in FIGS. 5(a) and 5(b).

When the panning shot mode is selected by shifting the switch SW1 to the contact position "a" thereof, the embodiment operates as follows: The panning shot mode computing circuit 1 is selected. Photometric computation is performed according to the program line A of FIG. 2. The analog switch 4$_3$ becomes conductive. A voltage Vcc·(R3+R4)/(R3+R4+R1) which is obtained via the resistors R1, R3 and R4 is supplied to the inverting input terminals of comparators 5 and 6. Therefore, even where the position of the lens system deviates from the in-focus position thereof to an extent corresponding to the voltage Vcc·(R3+R4)/(R3+R4+R1), the lens system is considered to be in an in-focus state. The degree of the focusing accuracy further decreases in this case. The degree of the focusing accuracy in this case is as indicated by the reference symbol iii in FIGS. 5(a) and 5(b). Further, where the snap shot mode is selected by shifting the switch SW1 to another contact position "d" thereof, the snap shot mode computing circuit 4 is selected. The photometric computation is then carried out according to the program line D of FIG. 2. Meanwhile, a voltage-divided voltage Vcc·(R2+R3+R4)/(R2+R3+R4+R1) is supplied to the inverting input terminals of the comparators 5 and 6. As a result of that, the focusing accuracy still further decreases. With the snap shot mode selected, therefore, the degree of the focusing accuracy becomes the lowest of the four selectable operation modes. It is an advantage of the arrangement of the embodiment that the in-focus state can be determined in a much shorter period of time than the conventional arrangement. In the latter a long period of time is consumed for obtaining a higher degree of focusing accuracy is absorbing a hunting phenomenon occurring at a point close to the in-focus position of the lens system. The focusing accuracy obtainable in the snap shot mode is as indicated by the reference symbol iv in FIGS. 5(a) and 5(b).

Figure 6:
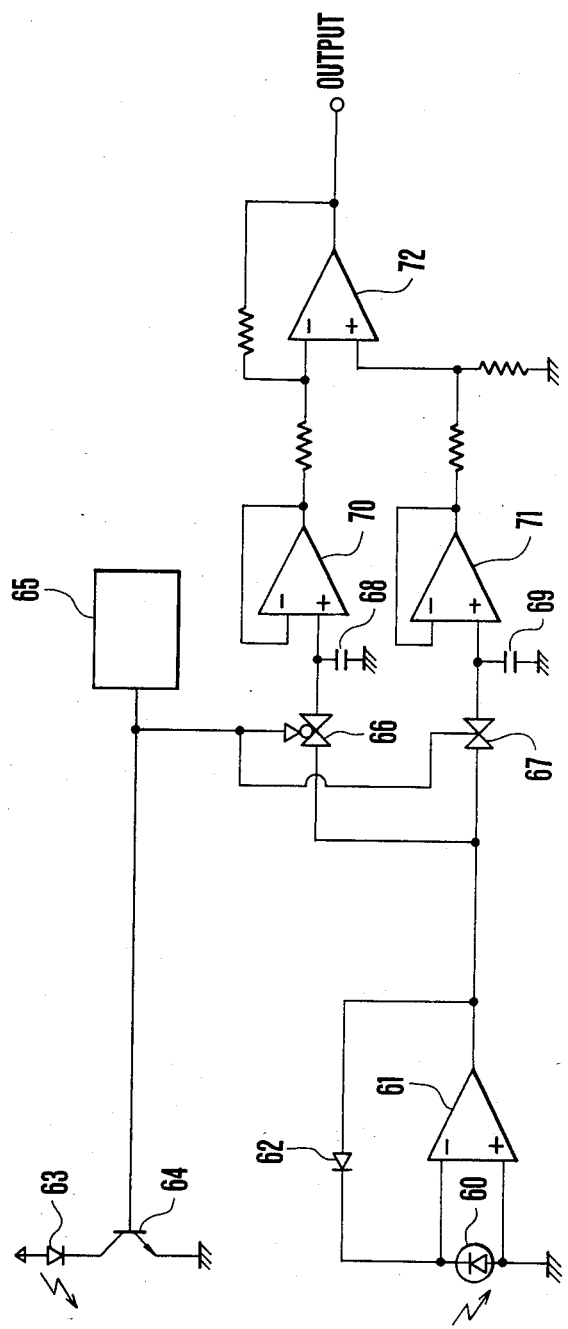
FIG. 6 is a circuit diagram showing by way of example the details of the distance measuring circuit 14 shown in FIG. 1.

The distance measuring circuit 14 shown in FIG. 1 is arranged, for example, as shown in FIG. 6. In FIG. 6, the distance measuring circuit includes a light receiving part composed of a light sensitive element 60, a diode 62 and an amplifier 61. A light emitting part in the measuring circuit is composed of a transistor 64 and an IRED 63 and is arranged to intermittently emit light in synchronism with pulses from a clock pulse generator 65 and thus to illuminate an object to be photographed. The light emitted from the light emitting part is reflected by the object. Then, the light reflected by the object is received by the light receiving part. Upon receipt of the reflected light, the light receiving part produces an output. The output of the light receiving part is transmitted to capacitors 68 and 69 via gates 66 and 67 which are arranged to alternately turn on in synchronism with the pulses produced from the above-stated pulse generator 65. An amplifier 72 is arranged to obtain a difference between the output of the light receiving part obtained when the light is emitted by the light emitting part and the output obtained when the light is not emitted. The distance measuring circuit thus produces an output corresponding to the object distance. Further, in accordance with the invention, the distance measuring circuit does not have to be arranged in this manner but may be arranged in any other manner that gives an output corresponding to the object distance.

In accordance with this invention, as described in the foregoing, the degree of focus determining accuracy is arranged to be variable according to the photographic operation mode selected. Where a long period of time is allowable for determining an in-focus state, as in the case of the portrait photography, the focus detecting accuracy is increased in determining an in-focus state. In cases where importance is attached to quick shooting, as in the case of snap shot photography, the in-focus state is arranged to be determined in a shorter period of time at a lower degree of focus detecting accuracy. Therefore, the in-focus state can be determined in a manner suited to the desire of the photographer.

Further, in the embodiment given, a focusing operation can be manually carried out by turning off the switch SW2.

What I claim:

1. A focus detecting device for a camera having a plurality of different kinds of automatic exposure determining modes, comprising:
   (a) a focus state detection circuit for detecting a focused state, said circuit being arranged for judging whether or not said focus state has come into an in-focus state;
   (b) an adjusting circuit for adjusting the judging accuracy of said focus state detection circuit by judging whether or or not said in-focus state is attained according to each mode selected from the plurality of exposure determining modes.

2. A focus detecting device for a camera according to claim 1 wherein one of said automatic exposure determining modes in a first mode for determining the shutter time value based on a prescribed aperture value and brightness, and another automatic exposure determining mode is a second mode for determining the aperture value based on a prescribed shutter time value and brightness, said adjusting circuit being arranged to determine the judging accuracy such that when said first mode is selected by judging accuracy will be higher than when said second mode is selected.

3. A focus detecting device for a camera having a plurality of different kinds of automatic exposure determining modes, comprising:
   (a) an in-focus detecting circuit for detecting whether or not a photo-taking lens is in an in-focus position, and
   (b) an adjusting circuit for adjusting the degree of a detecting accuracy of said in-focus detection circuit according to each mode selected from the plurality of automatic exposure determining modes.

4. A focus detecting device for a camera which selects a prescribed program curve out of a plurality of different kinds of program curves and performs an automatic exposure control based on the thus selected program curve, comprising:
   (a) a focus state detection circuit for detecting a focused state, said circuit being arranged for judging whether or not said focus state has come into an in-focus state; and
   (b) an adjusting circuit for adjusting the judging accuracy of said focus state detection circuit by judging whether or not said in-focus state is attained according to each program curve selected from said plurality of program curves.

5. A focus detecting device for a camera which selects a prescribed program curve out of a plurality of different kinds of program curves and performs an automatic exposure control based on the thus selected program curve, comprising:
   (a) an in-focus detection circuit for detecting whether or not a photo-taking lens is in an in-focus position; and
   (b) an adjusting circuit for adjusting the degree of a detecting accuracy of said in-focus detection circuit according to each curve selected from the plurality of program curves.

6. A focus detecting device for a camera having a plurality of automatic exposure determining modes for putting into effect an exposure control with respectively different automatic exposure determining characteristics depending on the purpose of a photo-taking operation, comprising:
   (a) a focus state detection circuit for detecting a focused state, said circuit being arranged to judge whether or not said focus state has come into an in-focus state;
   (b) an adjusting circuit for adjusting the judging accuracy of said focus state detection circuit by judging whether or not said in-focus state is attained according to each mode selected from the plurality of exposure determining modes.

* * * * *